United States Patent [19]

Roach

[11] 4,329,575
[45] May 11, 1982

[54] VIDEO DISC HAVING A LABEL FOR IDENTIFYING MATERIAL RECORDED THEREON

[75] Inventor: William R. Roach, Rocky Hill, N.J.

[73] Assignee: RCA Corporation, New York, N.Y.

[21] Appl. No.: 142,852

[22] Filed: Apr. 21, 1980

[51] Int. Cl.³ .................... G06K 19/06; G11B 7/24; G11B 23/40

[52] U.S. Cl. ................................. 235/487; 369/273; 369/274; 369/275; 369/277; 369/291

[58] Field of Search .................................. 369/30-34, 369/41, 77, 126, 109, 111, 272-279, 289, 291, 283-284, 54, 58; 365/234; 235/454, 462, 464, 470, 487, 494, 490

[56] References Cited

U.S. PATENT DOCUMENTS

| | | | |
|---|---|---|---|
| 1,877,079 | 9/1932 | Sturgis, Jr. ........................... | 369/273 |
| 2,038,563 | 4/1936 | Herrmann . | |
| 2,952,464 | 9/1960 | Stimley ................................ | 369/41 |
| 3,731,060 | 5/1973 | Weinstein . | |
| 3,991,883 | 11/1976 | Hobler et al. . | |
| 4,010,355 | 3/1977 | Roehrman et al. . | |
| 4,011,435 | 3/1977 | Phelps et al. ........................ | 235/487 |
| 4,023,010 | 5/1977 | Horst et al. ......................... | 235/487 |
| 4,084,185 | 4/1978 | de Lang et al. ..................... | 369/109 |
| 4,108,365 | 8/1978 | Hughes ................................ | 369/30 |
| 4,109,919 | 8/1978 | Elliott et al. ........................ | 369/77 |
| 4,143,810 | 3/1979 | Greenaway ......................... | 235/487 |
| 4,180,830 | 12/1979 | Roach .................................. | 369/54 |
| 4,204,638 | 5/1980 | Laude .................................. | 235/487 |

FOREIGN PATENT DOCUMENTS 325199  9/1929  United Kingdom .

*Primary Examiner*—Raymond F. Cardillo, Jr.
*Attorney, Agent, or Firm*—E. M. Whitacre; J. S. Tripoli; J. E. Roehling

[57] ABSTRACT

A video disc record suitable for use with a video disc player apparatus is provided with a label for identifying the program material stored on the surface of the record. The label is formed in a machine readable format which comprises grooves in the surface of the record. In one format, whorls of a spiral groove on the surface of the record are spaced alternately with ungrooved areas on the surface. A readout apparatus comprises a light beam which is arranged to scan the grooved label and a detecetor which is arranged to sense the light beam reflected from the disc record surface. Light striking an ungrooved section is reflected in a substantially specular direction while light striking a grooved section is substantially scattered out of the specular direction. The detector is arranged to collect the light reflected into the specular direction.

8 Claims, 5 Drawing Figures

VIDEO DISC HAVING A LABEL FOR IDENTIFYING MATERIAL RECORDED THEREON

The present invention relates generally to marking systems and, more particularly, to marking systems for identifying program material on disc records.

In certain video disc systems, information is stored on a disc record in the form of geometric variations in a continuous spiral groove disposed on the record surface. Variations in capacitance between an electrode incorporated in a groove-riding stylus and a conductive property of the record are sensed to reproduce the stored information. A capacitance-type video disc system is illustratively disclosed in U.S. Pat. No. 3,842,194 (Clemens).

In such systems, as well as non-capacitive disc systems, it is often beneficial to enclose the disc record in a protective caddy to provide a dust-free environment for the disc and to deter indiscriminate access to the record. For an illustration of a protective caddy and video disc record combination and a disc player for use with the caddy-record combination, reference may be made to U.S. patent application Ser. No. 098,417 filed Nov. 28, 1979 for Coleman, et al., now U.S. Pat. No. 4,239,108.

In the audio record industry, a record disc is enclosed in a protective sheath. The record disc is generally provided with a paper label which includes information concerning the artist, program material, length of play, copyright, etc. Additionally, the outside surface of the protective sheath is provided with printed information corresponding to the data included on the label of the disc. This redundant information on the audio record and the protective sheath provides the user with necessary information for matching disc and sheath.

In the Coleman system, the user does not remove, or at least is discouraged from removing, the disc from the caddy. Information with respect to program material on one side of a disc vis-a-vis the other side is generally printed on the outside surfaces of the caddy and the disc is not, in general, removed from the caddy by the user outside of the player. Since the user does not remove the disc from the caddy, there is no need to provide a user readable label on the disc. Even though it may not be necessary to provide printed information (i.e., user readable) concerning the program content on the disc record, it is desirable to encode the disc so that the disc and caddy may be matched or correlated during the manufacturing cycle without playing the disc to determine the program material thereon. It would be undesirable to have a disc containing program A placed in a caddy having a label designating program material B.

One of the primary purposes of the protective caddy is to provide a clean environment for the disc stored therein. Thus, it is not desirable to use a label of some foreign material such as paper or paint which may flake off inside of the protective cavity.

Further, it is desirable to reduce the amount of human or machine handling of a video disc record. If a paper or paint label were to be attached to the record an additional manipulation step would be required during the record manufacturing cycle to attach said label.

In accordance with the principles of the present invention, an identification system for video disc records is provided wherein a surface of the disc is provided with a coded surface effect which is readable by an optical scanner apparatus. Thus, according to one aspect of this invention, no paper, paint or other foreign material is used on the disc record for identification.

Further, in accordance with the principles of the present invention, a labeling system is provided which is stamped into the disc record surface during the disc stamping operation, thus eliminating any additional manufacturing steps or costs for labeling video disc records.

According to another aspect of the invention, the protective caddy is provided with a machine readable label such that the caddy and the video disc record may be matched during the manufacturing operation by mechanized means.

Other features and advantages of the invention will be more fully understood from the following detailed description of the preferred embodiment, the appended claims, and the accompanying drawing in which:

Figure 1:
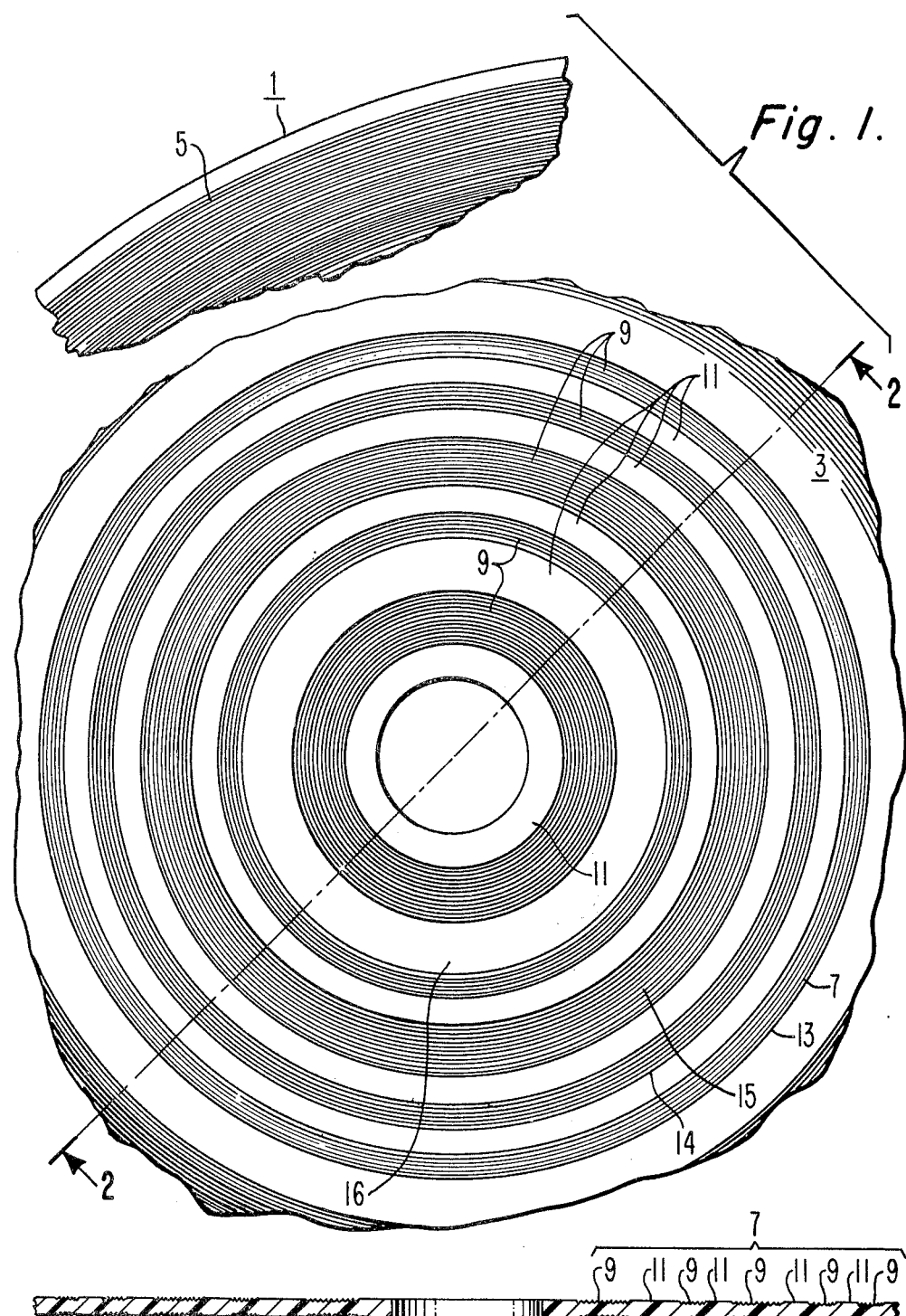
FIG. 1 illustrates a plan view of a video disc record having a grooved label in accordance with the principles of the present invention.
Figure 2:
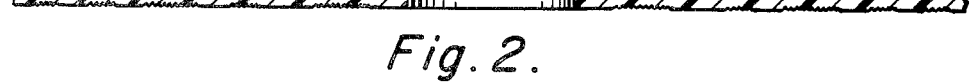
FIG. 2 illustrates a cross-sectional view of section 2—2 of FIG. 1.

FIG. 1 illustrates a plan view of a video disc record 1 having a grooved label in accordance with one aspect of the present invention. The video disc record 1 which is formed of conductive-plastic material, such as carbon dispersed in a polyvinyl chloride base, has an annular area 3 including a spiral information track 5. In one format for a video disc, information stored in the form of undulations along the length of spiral track 5 is recovered by detecting variations in the capacitance formed by the disc and stylus electrode for playback on a color television receiver. A second annular area 7 on the surface of disc record 1 comprises first surface regions 9 which alternate with second surface regions 11. FIG. 2 illustrates a cross-sectional view of section 2—2 of FIG. 1. Surface regions 9 are provided with a surface effect, such as a V-shaped spiral groove of 110° included angle and a pitch of approximately 8,000 grooves per inch, while surface regions 11 are provided with another surface effect, such as a flat specular surface. Thus, area 7, which, as will be discussed more fully herein, forms the disc label, comprising two different surface regions.

In U.S. patent application Ser. No. 142,855 for G. John entitled "Variable Pitch Grooved Label for Video Disc" which was filed on Apr. 21, 1980 another identification scheme is illustrated. As described therein the surface regions are provided with a spiral groove of varying pitch. As illustrated in the John application, surface regions 9 may be provided with a spiral groove having a pitch of approximately 8,000 grooves per inch and surface regions 11 may be provided with a spiral groove having a pitch of approximately 1,000 grooves per inch.

The arrangement and width of surface regions 9 and 11 may be representative of a code used to identify the program material contained in spiral track 5. The coded representation may be read out by scanning annular area 7 with a light beam or by imaging it onto a fixed detector as illustrated in an application entitled "Apparatus For Reading An Identifying Label On An Information Record" filed concurrently herewith. Light incident on a grooved surface region 9 is diffracted or scattered primarily into directions such that a large portion of the incident light is reflected in nonspecular directions while light incident on a region 11 is reflected specularly, i.e., regions 11 respond much like a mirror. Readout of the coded disc pattern will be explained more fully with respect to FIG. 4.

In one embodiment, the coded pattern of annular area 7 may comprise a two-out-five interleaved code which corresponds to a digital representation of the identity of the program material on disc record 1. In a two-out-of-five interleaved code, sense markings 13 and 14 of a first width (e.g., narrow band) correspond to a first binary digit such as an "0" and sense markings 15 and 16 of a second width (e.g., wide band) correspond to another binary digit such as a "1".

The label which is coded by the varying widths and arrangement of surface regions 9 and 11 in annular area 7 may be formed by machining sets of fine grooves into a metal substrate during the record manufacturing process. A stamper disc may be derived from the metal substrate, as by techniques described in the Clemens' patent, and utilized, through record stamping machinery, to produce a plurality of replica discs, each replica disc having the same fine groove pattern which appears in the metal substrate.

Figure 3:
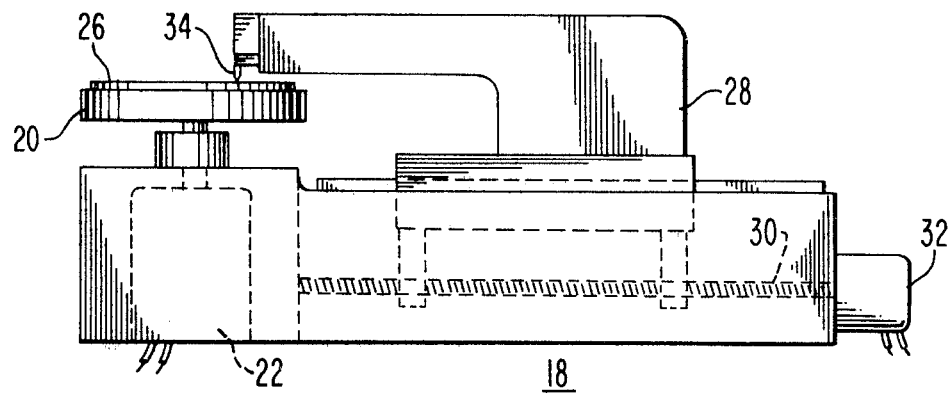
FIG. 3 represents a side view of a mechanical lathe apparatus which is suitable for cutting a grooved label into a surface of a metal master.

In FIG. 3 a side view of a mechanical lathe apparatus 18 for cutting a grooved label into the surface of a master disc is illustrated. A turntable 20 is rotated at a substantially constant velocity of, for example, 450 rpm by a motor 22. A vacuum pad (not shown) which is interposed between a copper coated aluminum substrate 26 shaped in the form of a disc and turntable 20 operates to retain disc 26 on turntable 20. A movable support member 28 is coupled to a lead screw 30 which is driven by motor 32. The movable support member 28 has affixed thereto cutting stylus 34. When lathe 18 is used to cut a grooved label, cutting stylus 34 is adjusted to impinge upon disc 26 and is operated to radially traverse disc 26 while turntable 20 is rotated. The relative motion established between stylus 34 and disc 26 effects a spiral groove pattern. In one embodiment, stylus 34 is raised and lowered during the cutting operation such that whorls of spiral grooves (i.e., corresponding to surface regions 9 of FIG. 1) are spaced alternately with annular areas of non-grooves (i.e., corresponding to surface regions 11 of FIG. 1).

Figure 4:
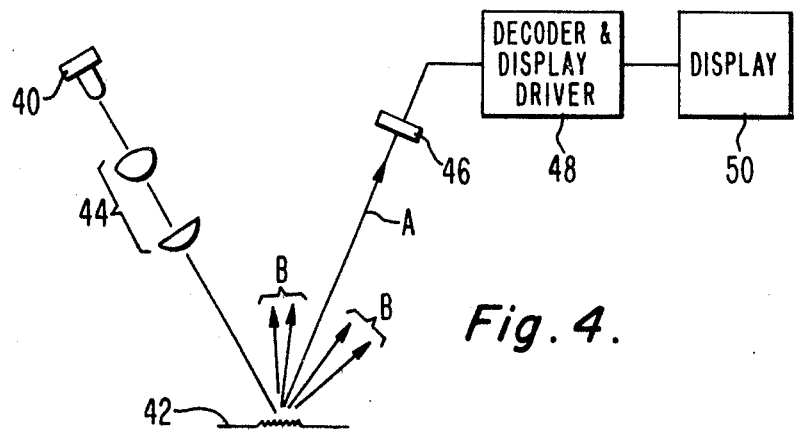
FIG. 4 shows apparatus for optically reading the identifying indices of a video disc record of a type illustrated in FIG. 1.

FIG. 4 illustrates an apparatus for reading the identifying indices or label of the video disc record. A set of condenser optics 44 is interposed between a projection lamp 40 and video disc record surface 42 such that the light from lamp 40 impinges on the coded portion of disc record surface 42. The light beam which impinges on the disc surface is either reflected in a specular direction A or scattered in diffracted directions B depending upon whether the impinging light beam is incident on a smooth or grooved section of the coded disc surface respectively. In one arrangement detector 46 (e.g., Reticon camera having 1024 elements) is positioned to collect the specularly reflected light in direction A (i.e., light reflected from a smooth [ungrooved] region of the code). When the light beam falls onto an area of the disc surface where the density of grooves is high (e.g., 8,000 grooves/inch) the majority of the light is diffracted or scattered out of the specular direction A and thus does not reach the detector or, at least, does not reach the detector with the intensity of specularly reflected light. The output of detector 46, which is in the form of a digital pulse train corresponding to the narrow and wide bands of a code (illustratively, an interleaved 2-of-5 code), is fed to decoder and display driver 48. The output of display driver 48 is then fed to a display 50 (e.g., a 10-digit LED) which provides a digital output representative of the coded pattern recorded on the disc record surface. Alternatively, the output from detector 46 may be fed to a commercial decoder (e.g., Identicon Series 600) which may be used in a caddy matching system.

Figure 5:
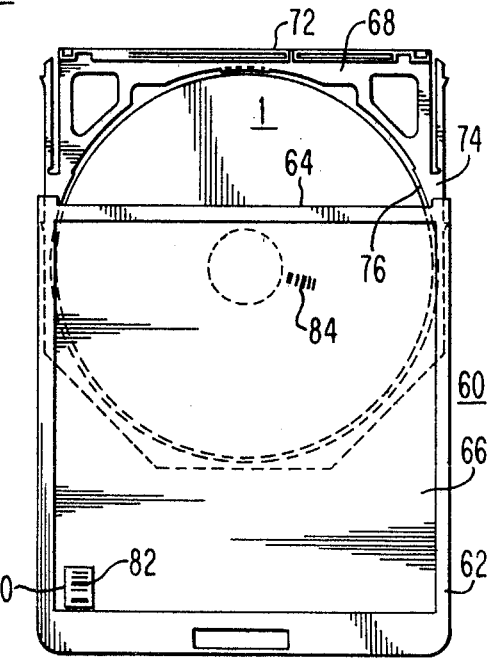
FIG. 5 illustrates a plan view of a video disc record/protective caddy combination.

As shown in FIG. 5, video disc caddy 60 comprises a jacket 62 having an edge opening 64 communicating with a record enclosing cavity 66 and a record retaining spine 68. The record retaining spine has a portion 72 which serves as a closure when the spine is fully inserted into the jacket 62 and a portion 74 having a circular opening 76 for receiving record 1. Affixed to jacket 62 is a label 80 having a bar code 82 representative of a code used to identify the program material stored on record 1 enclosed therein. The coded pattern 84 incorporated on record 1 within the center area of the disc corresponds to bar code 82 on label 80 of caddy 60.

The disc record 1 and caddy 60 may be mated during the record manufacturing process. The disc record 1 which has been prepared for customer playback may be identified by reading the product code peculiar to that particular disc with an apparatus of the type described with reference to FIG. 4. Simultaneously, the product code of the caddy 60 which has been labeled may be identified by scanning bar code 82 with an Identicon 628 commercial decoder. If the product code on record disc 1 matches the product code on caddy 60, an operator slides record disc 1 and record retaining spine 68 into jacket 62. The caddy/disc assembly is then shrink wrapped prior to shipment to the customer.

While the principles of the present invention have been demonstrated with particular regard to the illustrative structures of FIGS. 1-5, it will be recognized by those of skill in the art that various departures from such illustrative structures may be undertaken in practice of the invention (i.e., other label surface effects or patterns may be used on the record surface). For example, the interleaved grooved/ungrooved pattern may be replaced by stippled surface regions alternating with smooth surface regions or matte surface regions alternating with smooth surface regions. Also, the coded representation may be arranged in a pattern other than a bullseye. For example, the interleaved pattern could be arranged radially.

What is claimed is:

1. A disc record for storing information signals of a given program, said disc record comprising:
 a first annular area on a surface of said disc having an information track therein comprising elements corresponding to the information signals stored on said disc record; and
 a second annular area on said surface of said disc having a first plurality of surface regions and a second plurality of surface regions, said second annular area being concentric with said first annular area and positioned such that the outer diameter of said second annular area is less than the inner diameter of said first annular area;

said first plurality of surface regions having a surface effect for deflecting light in a first direction;

said second plurality of surface regions having a surface effect for deflecting light substantially away from said first direction;

each of said first plurality of surface regions alternating with each of said second plurality of surface regions to form a pattern of concentric annular surface regions having regions of said first surface effect interleaved with regions of said second surface effect;

each of said surface regions having a dimension representative of an element of a digital code, surface regions of a first dimension being representative of a first code state and surface regions of a second dimension being representative of a second code state;

each of said surface regions of said pattern of concentric annular surface regions being dimensioned to identify a given state of said code such that said pattern of concentric annular surface regions provides a machine readable digital code representative of the identity of said given program.

2. The disc record in accordance with claim 1 wherein the surface of said first plurality of surface regions is specular such that light deflected by said specular surface is reflected in a specular direction; and wherein the surface of said second plurality of regions has a texture such that light deflected by said textured surface is substantially reflected away from said specular direction.

3. The disc record according to claim 1 wherein said second plurality of surface regions comprise a plurality of bands of whorls of groove convolutions; and wherein said first plurality of surface regions comprise specular areas interposed between said bands of whorls of said second surface regions.

4. The disc record according to claim 1 wherein the surface of said first plurality of surface regions is specular; and wherein the surface of said second plurality of surface regions is provided with a spiral groove.

5. In a video disc system for information recovery of video and sound signals, the combination comprising:

a disc record for storing a given program which includes said video and sound signals, said disc record comprising:

a first annular area on a surface of said disc having an information track therein comprising elements representative of said given program; and a second annular area on said surface of said disc having a first plurality of surface regions and a second plurality of surface regions, said second annular area being concentric with said first annular area and positioned such that the outer diameter of said second annular area is less than the inner diameter of said first annular area;

said first plurality of surface regions having a surface effect for deflecting light in a first direction;

said second plurality of surface regions having a surface effect for deflecting light substantially away from said first direction;

each of said first plurality of surface regions alternating with each of said second plurality of surface regions to form a pattern of concentric annular surface regions having regions of said first surface effect interleaved with regions of said second surface effect;

each of said surface regions having a dimension representative of an element of a digital code, surface regions of a first dimension being representative of a first code state and surface regions of a second dimension being representative of a second code state;

each of said surface regions of said pattern of concentric annular surface regions being dimensioned to identify a given state of said code such that said pattern of concentric annular surface regions provides a machine readable digital code representative of the identity of said given program; and a caddy for providing a protective closure for said disc record, said caddy comprising:

a jacket for receiving said disc record; and a label attached to said jacket for identifying said given program on the video disc record intended to be stored in said caddy, said label being machine readable.

6. The combination according to claim 5 wherein said second plurality of surface regions comprise a plurality of bands of whorls of groove convolutions; and wherein said first plurality of surface regions comprise specular areas interposed between said bands of whorls of said second surface regions.

7. The combination in accordance with claim 5 wherein the surface of said first plurality of surface regions is specular such that light deflected by said specular surface is reflected in a specular direction; and wherein the surface of said second plurality of surface regions has a texture such that light deflected by said textured surface is substantially reflected away from said specular direction.

8. The combination according to claim 5 wherein the surface of said first plurality of surface regions is specular; and wherein the surface of said second plurality of surface regions is provided with a spiral groove.

* * * * *

UNITED STATES PATENT AND TRADEMARK OFFICE
CERTIFICATE OF CORRECTION

PATENT NO. : 4,329,575
DATED : May 11, 1982
INVENTOR(S) : William R. Roach

It is certified that error appears in the above—identified patent and that said Letters Patent is hereby corrected as shown below:

Abstract, line 10 - delete "detecetor" and insert

--- detector ---.

Signed and Sealed this

Twenty-fourth Day of August 1982

[SEAL]

Attest:

GERALD J. MOSSINGHOFF

*Attesting Officer*     *Commissioner of Patents and Trademarks*